US012016357B2

(12) United States Patent
Carlson et al.

(10) Patent No.: US 12,016,357 B2
(45) Date of Patent: Jun. 25, 2024

(54) GLYCOSIDE COMPOSITIONS

(71) Applicant: CARGILL, INCORPORATED, Wayzata, MN (US)

(72) Inventors: Ting Liu Carlson, Marietta, SC (US); Michael Alan Mortenson, Rogers, MN (US); Sean Acie Smith, Minneapolis, MN (US)

(73) Assignee: CARGILL, INCORPORATED, Wayzata, MN (US)

( * ) Notice: Subject to any disclaimer, the term of this patent is extended or adjusted under 35 U.S.C. 154(b) by 78 days.

(21) Appl. No.: 17/656,052

(22) Filed: Mar. 23, 2022

(65) Prior Publication Data

US 2022/0287343 A1  Sep. 15, 2022

Related U.S. Application Data

(63) Continuation of application No. 15/575,719, filed as application No. PCT/US2016/033564 on May 20, 2016, now abandoned.

(60) Provisional application No. 62/164,191, filed on May 20, 2015.

(51) Int. Cl.
A23L 27/30 (2016.01)
A23L 2/60 (2006.01)

(52) U.S. Cl.
CPC ............... *A23L 27/36* (2016.08); *A23L 2/60* (2013.01); *A23V 2002/00* (2013.01)

(58) Field of Classification Search
CPC ........ A23L 27/36; A23L 2/60; A23V 2002/00
USPC ....................................................... 426/590
See application file for complete search history.

(56) References Cited

U.S. PATENT DOCUMENTS

| | | | |
|---|---|---|---|
| 4,312,856 A | 1/1982 | Korduner | |
| 4,361,697 A | 11/1982 | Dobberstein | |
| 4,853,237 A | 8/1989 | Prinkkila | |
| 4,886,677 A | 12/1989 | Kondou | |
| 4,902,525 A | 2/1990 | Kondou | |
| 5,008,254 A * | 4/1991 | Weibel | A21D 2/183 424/439 |
| 5,041,541 A | 8/1991 | Mazur | |
| 5,043,169 A | 8/1991 | Cherukuri | |
| 5,061,320 A | 10/1991 | Goodacre | |
| 5,064,672 A | 11/1991 | Mazur | |
| 5,080,910 A | 1/1992 | Cherukuri | |
| 5,080,916 A | 1/1992 | Kondou | |
| 5,106,967 A | 4/1992 | Mazur | |
| 5,202,507 A | 4/1993 | Ohshima | |
| 5,401,519 A | 3/1995 | Sabase | |
| 5,510,250 A | 4/1996 | Aga | |
| 5,523,099 A | 6/1996 | Aga | |
| 5,656,308 A | 8/1997 | Aga | |
| 5,681,569 A | 10/1997 | Kuznicki | |
| 5,902,624 A | 5/1999 | Vleugels | |
| 5,962,678 A | 10/1999 | Payzant | |
| 5,973,212 A | 10/1999 | De Sadeleer | |
| 6,015,792 A | 1/2000 | Kurtz | |
| 6,030,820 A | 2/2000 | Morioka | |
| 6,045,850 A | 4/2000 | Kondou | |
| 6,056,980 A | 5/2000 | Unno | |
| 6,180,155 B1 | 1/2001 | Lotz | |
| 6,180,157 B1 | 1/2001 | Fotos | |
| 6,214,402 B1 | 4/2001 | Fotos | |
| 6,251,464 B1 | 6/2001 | Felisaz | |
| 6,365,216 B1 | 4/2002 | Dron | |
| 6,365,217 B2 | 4/2002 | Fotos | |
| 6,423,358 B1 | 7/2002 | Barndt | |
| 6,432,464 B1 | 8/2002 | Andersen | |
| 6,461,659 B1 | 10/2002 | Zhou | |
| 6,506,434 B1 | 1/2003 | Towb | |
| 6,589,588 B1 | 7/2003 | Wester | |
| 6,635,774 B2 | 10/2003 | Roden | |
| 6,652,901 B2 | 11/2003 | Ishii | |
| 6,703,057 B2 | 3/2004 | Duffett | |
| 6,761,922 B2 | 7/2004 | Ishii | |
| 6,800,317 B2 | 10/2004 | Wester | |
| 6,989,171 B2 | 1/2006 | Portman | |
| 7,029,717 B1 | 4/2006 | Ojima | |
| 7,090,883 B2 | 8/2006 | Phipps | |
| 7,179,488 B2 | 2/2007 | Sherwood | |
| 7,267,835 B2 | 9/2007 | Kitazume | |
| 7,579,032 B2 | 8/2009 | Lee | |
| 7,815,956 B2 | 10/2010 | Lee | |
| 7,862,845 B2 | 1/2011 | Magomet | |

(Continued)

FOREIGN PATENT DOCUMENTS

| | | |
|---|---|---|
| CA | 2656576 C | 6/2012 |
| CA | 2656585 C | 10/2012 |

(Continued)

OTHER PUBLICATIONS

NPL Prakash et al. (in Foods 2014, vol. 3 pp. 162-175) (Year: 2014).*
Anne et al. "Impact of the olfactory quality and chemical complexity of the flavouring agent on the texture of low fat stirred yogurts assessed by three different sensory methodologies", Food Quality and preference, 2004, pp. 654-668.
Bai Xinpeng, "Functional Food Design and Evaluation", First Edition, Beijing: China Metrology Publishing House, p. 47, Jun. 30, 2009.
C Hellfritsch et al., "Human Psychometric and Taste Receptor Responses to Steviol Glycosides", Journal of Agricultural and Food Chemistry, (20120500), vol. 60, doi: 10.1021/jf301297n, pp. 6782-6793, XP055715001.

(Continued)

Primary Examiner — Erik Kashnikow
Assistant Examiner — Bhaskar Mukhopadhyay

(57) ABSTRACT

Sweetener compositions having particular glycoside compositions are described herein. The glycoside compositions include rebaudioside D and/or rebaudioside M that are combined with other glycosides such as rebaudioside E, rebaudioside G, rebaudioside N and/or rebaudioside O. The sweetener compositions can also include one or more bulking agents or other ingredients. The sweetener compositions can be used in foods and beverages.

19 Claims, No Drawings

(56) References Cited

U.S. PATENT DOCUMENTS

| | | |
|---|---|---|
| 7,964,232 B2 | 6/2011 | Lee |
| 8,377,491 B2 | 2/2013 | Prakash |
| 8,703,225 B2 | 4/2014 | Morita |
| 8,962,698 B2 | 2/2015 | Bridges |
| 2002/0001652 A1 | 1/2002 | Dron |
| 2002/0065245 A1 | 5/2002 | Brouwers |
| 2003/0026872 A1 | 2/2003 | Dake |
| 2003/0045473 A1 | 3/2003 | Sarama |
| 2003/0136538 A1 | 7/2003 | Rautiainen |
| 2003/0165603 A1 | 9/2003 | Burklow |
| 2003/0170365 A1 | 9/2003 | Huang |
| 2004/0022914 A1 | 2/2004 | Allen |
| 2004/0058050 A1 | 3/2004 | Guo |
| 2004/0156993 A1 | 8/2004 | Satomi |
| 2004/0197453 A1 | 10/2004 | Hirao |
| 2005/0079232 A1 | 4/2005 | Offord-Cavin |
| 2005/0106215 A1 | 5/2005 | Offord-Cavin |
| 2005/0112260 A1 | 5/2005 | Abraham |
| 2005/0123662 A1 | 6/2005 | Wanezaki |
| 2005/0142271 A1 | 6/2005 | Ojima |
| 2005/0214425 A1 | 9/2005 | Vazirani |
| 2005/0220868 A1 | 10/2005 | Lahl |
| 2005/0226983 A1 | 10/2005 | Bakal |
| 2005/0241490 A1 | 11/2005 | Hamiel |
| 2006/0034993 A1 | 2/2006 | Saelzer |
| 2006/0088635 A1 | 4/2006 | Goldman |
| 2006/0172392 A1 | 8/2006 | Zhou |
| 2006/0177553 A1 | 8/2006 | Kubota |
| 2006/0240163 A1 | 10/2006 | Catani |
| 2007/0026121 A1 | 2/2007 | Benedict |
| 2007/0082106 A1 | 4/2007 | Lee |
| 2007/0116823 A1 | 5/2007 | Prakash |
| 2007/0116828 A1 | 5/2007 | Prakash |
| 2007/0116836 A1 | 5/2007 | Prakash |
| 2007/0128311 A1 | 6/2007 | Prakash |
| 2007/0166828 A1 | 7/2007 | Strothers |
| 2007/0280892 A1 | 12/2007 | Kindel |
| 2008/0107775 A1 | 5/2008 | Prakash |
| 2008/0292765 A1 | 11/2008 | Prakash |
| 2009/0004355 A1 | 1/2009 | Catani |
| 2009/0017185 A1 | 1/2009 | Catani |
| 2009/0053378 A1 | 2/2009 | Prakash |
| 2010/0015320 A1 | 1/2010 | King |
| 2010/0099587 A1 | 4/2010 | Welton |
| 2010/0099857 A1 | 4/2010 | Evans |
| 2010/0137569 A1 | 6/2010 | Prakash |
| 2010/0227034 A1 | 9/2010 | Purkayastha |
| 2010/0267847 A1 | 10/2010 | Yoshinaka |
| 2010/0285201 A1 | 11/2010 | Catani |
| 2010/0316782 A1 | 12/2010 | Shi |
| 2011/0059218 A1 | 3/2011 | Corliss |
| 2011/0087011 A1 | 4/2011 | Chiang |
| 2011/0091637 A1 | 4/2011 | Abelyan |
| 2011/0092684 A1 | 4/2011 | Abelyan |
| 2011/0104353 A1 | 5/2011 | Lee |
| 2011/0111115 A1 | 5/2011 | Shi |
| 2011/0183056 A1* | 7/2011 | Morita .................. A23L 27/36 426/442 |
| 2011/0189360 A1 | 8/2011 | Yoo |
| 2011/0195169 A1 | 8/2011 | Markosyan |
| 2011/0287164 A1 | 11/2011 | Markosyan |
| 2012/0058236 A1 | 3/2012 | Fosdick |
| 2012/0058247 A1 | 3/2012 | Shi |
| 2012/0157553 A1 | 6/2012 | Dewis |
| 2012/0164083 A1 | 6/2012 | Palmer |
| 2012/0189739 A1 | 7/2012 | Rathke |
| 2012/0269954 A1 | 10/2012 | Bridges |
| 2012/0295003 A1 | 11/2012 | Daniel |
| 2013/0011539 A1 | 1/2013 | Chang |
| 2013/0059030 A1 | 3/2013 | Sips |
| 2013/0171315 A1* | 7/2013 | Delfosse .................. A23L 33/21 426/548 |
| 2013/0330463 A1 | 12/2013 | Markosyan |
| 2014/0004244 A1* | 1/2014 | Putter .................. A23L 2/60 426/580 |
| 2014/0030381 A1 | 1/2014 | Markysyan |
| 2014/0099403 A1 | 4/2014 | Prakash |
| 2014/0171519 A1 | 6/2014 | Prakash |
| 2014/0212562 A1* | 7/2014 | Daniel .................. A23L 27/34 426/548 |
| 2014/0227421 A1 | 8/2014 | Markosyan |
| 2014/0272068 A1* | 9/2014 | Prakash .................. A23L 2/56 426/597 |
| 2014/0296499 A1 | 10/2014 | Chen |
| 2014/0342043 A1 | 11/2014 | Bell |
| 2015/0017284 A1 | 1/2015 | Prakash |
| 2015/0320101 A1 | 11/2015 | Walton |
| 2016/0015064 A1 | 1/2016 | Luo |
| 2018/0049455 A1 | 2/2018 | Morita |

FOREIGN PATENT DOCUMENTS

| | | |
|---|---|---|
| CN | 1878528 A | 12/2006 |
| CN | 101163413 A | 4/2008 |
| CN | 101340827 A | 1/2009 |
| CN | 101562992 A | 10/2009 |
| CN | 101662955 A | 3/2010 |
| CN | 102216313 A | 10/2011 |
| CN | 102762111 A | 10/2012 |
| CN | 102811629 A | 12/2012 |
| CN | 103153093 A | 6/2013 |
| CN | 103159808 A | 6/2013 |
| CN | 104684414 A | 6/2015 |
| CN | 107404919 A | 11/2017 |
| CN | 103974628 B | 4/2019 |
| CN | 105722533 B | 10/2020 |
| DE | 19653354 C1 | 9/1998 |
| EP | 0197822 B1 | 6/1988 |
| EP | 0154235 B1 | 6/1991 |
| EP | 0464833 B1 | 6/1994 |
| EP | 0287957 B2 | 8/1996 |
| EP | 0821055 B1 | 12/2003 |
| EP | 0839916 B1 | 11/2005 |
| EP | 1469081 B1 | 7/2008 |
| EP | 1210880 B1 | 12/2008 |
| EP | 2358730 B1 | 8/2011 |
| EP | 2190854 B1 | 11/2011 |
| EP | 2397485 A | 12/2011 |
| EP | 2433505 A1 | 3/2012 |
| EP | 2443942 A1 | 4/2012 |
| EP | 2474240 A1 | 7/2012 |
| EP | 3269257 A1 | 1/2018 |
| JP | 51133461 A | 11/1976 |
| JP | 5283731 A | 7/1977 |
| JP | 62155096 A | 7/1987 |
| JP | 0195741 A | 4/1989 |
| JP | 04148659 A | 5/1992 |
| JP | 04222575 A | 8/1992 |
| JP | 06148659 A | 5/1994 |
| JP | 09173009 A | 7/1997 |
| JP | 2002078463 A | 3/2002 |
| JP | 2006223104 A | 8/2006 |
| JP | 2007195449 A | 8/2007 |
| JP | 2010516764 A | 5/2010 |
| JP | 4966381 B2 | 6/2010 |
| JP | 2010521165 A | 6/2010 |
| JP | 2011135889 A | 7/2011 |
| JP | 2012504552 A | 2/2012 |
| JP | 2013518118 A | 5/2013 |
| JP | 2013545490 A | 12/2013 |
| JP | 2014207899 A | 11/2014 |
| JP | 2015502204 A | 1/2015 |
| JP | 2015502404 A | 1/2015 |
| RU | 2216208 C2 | 11/2003 |
| RU | 2002111689 A | 12/2003 |
| RU | 2282367 C1 | 8/2006 |
| WO | 9802050 W | 1/1998 |
| WO | 199804156 A1 | 2/1998 |
| WO | 199930577 A1 | 6/1999 |
| WO | 0036933 A1 | 6/2000 |
| WO | 2001060842 A2 | 8/2001 |
| WO | 0205660 A2 | 1/2002 |
| WO | 2004005227 A1 | 1/2004 |
| WO | 2005014839 A2 | 2/2005 |

(56) References Cited

FOREIGN PATENT DOCUMENTS

| | | |
|---|---|---|
| WO | 2005048964 A1 | 6/2005 |
| WO | 2006015880 A1 | 2/2006 |
| WO | 2006027796 A2 | 3/2006 |
| WO | 2007082106 W | 7/2007 |
| WO | 2008011915 A1 | 1/2008 |
| WO | 2008012106 A1 | 1/2008 |
| WO | 2008036234 A1 | 3/2008 |
| WO | 2008091547 A2 | 7/2008 |
| WO | 2008112852 A1 | 9/2008 |
| WO | 2008112872 W | 9/2008 |
| WO | 2008150952 A1 | 12/2008 |
| WO | 2009086049 A2 | 7/2009 |
| WO | 2009137838 A1 | 11/2009 |
| WO | 2009140394 A1 | 11/2009 |
| WO | 2009140568 A1 | 11/2009 |
| WO | 2010038911 A1 | 4/2010 |
| WO | 2010118218 A1 | 10/2010 |
| WO | 2010146463 A2 | 12/2010 |
| WO | 2011028671 A1 | 3/2011 |
| WO | 2011046423 A1 | 4/2011 |
| WO | 2011055231 A2 | 5/2011 |
| WO | 2011056834 A2 | 5/2011 |
| WO | 2011090709 A1 | 7/2011 |
| WO | 2011094423 A1 | 8/2011 |
| WO | 2011097359 A2 | 8/2011 |
| WO | 2011112892 A1 | 9/2011 |
| WO | 2011143465 A1 | 11/2011 |
| WO | 2012068457 A1 | 5/2012 |
| WO | 2012073121 A2 | 6/2012 |
| WO | 2012082493 A1 | 6/2012 |
| WO | 2012082587 A2 | 6/2012 |
| WO | 2012082677 A1 | 6/2012 |
| WO | 2012088598 A1 | 7/2012 |
| WO | 2012094752 A1 | 7/2012 |
| WO | 2012102769 A1 | 8/2012 |
| WO | 2012108894 A1 | 8/2012 |
| WO | 2012109585 A1 | 8/2012 |
| WO | 2012166163 A1 | 12/2012 |
| WO | 2013066490 A1 | 5/2013 |
| WO | 2013074481 A1 | 5/2013 |
| WO | 2013096420 A1 | 6/2013 |
| WO | 2013102793 A2 | 7/2013 |
| WO | 2013176738 A1 | 11/2013 |
| WO | 2014052457 A1 | 4/2014 |
| WO | 2014107642 A1 | 7/2014 |
| WO | 2014122227 A2 | 8/2014 |
| WO | 2014122328 A1 | 8/2014 |
| WO | 2014146084 A1 | 9/2014 |
| WO | 2014146135 A2 | 9/2014 |
| WO | 2014153000 A1 | 9/2014 |
| WO | 2014197898 A1 | 12/2014 |
| WO | 2015006764 A1 | 1/2015 |
| WO | 2015023928 A1 | 2/2015 |
| WO | 2015094688 A1 | 6/2015 |
| WO | 2015116785 A1 | 8/2015 |
| WO | 2015126876 A1 | 8/2015 |
| WO | 2016143361 A1 | 9/2016 |
| WO | 2017053980 A1 | 3/2017 |
| WO | 2017218036 A1 | 12/2017 |
| WO | 2017218888 A1 | 12/2017 |

OTHER PUBLICATIONS

CCC: Calorie Control Council: Stevia; published Jul. 23, 2009.
Chatsudthipong et al., "Stevioside and related compounds: Therapeutic benefits beyond sweetness", Pharmacology & Therapeutics, (2009), vol. 121, No. 1, pp. 41-54.
Chaturvedula et al., "Isolation, NMR Spectral Analysis and Hydrolysis Studies of a Hepta Pyranosyl Diterpene Glycoside from Stevia rebaudiana Bertoni", Biomolecules 2013, 3, 733-740.
Chaturvedula, V.S.P., Yu, 0., Mao, G. 2013. "Structural characterization of the hydrolysis products of Rebaudioside M, a minor steviol glycoside of Stevia rebaudiana Bertoni." Journal of Chemical and Pharmaceutical Research. Vol. 5, pp. 606-611.
Communication pursuant to Rule 114(2) EPC mailed Aug. 30, 2019 for European Application No. 16797397.3.
FDA GRAS Notice (GRN) No. 473; http://www.fda.gov/Food/IngredientsPackagingLabeling/NoticeInventory/default. htm. (141 pages).
FDA GRAS Notice (GRN) No. 512; http://www.fda.gov/Food/IngredientsPackagingLabeling/GRAS/NoticeInventory/ default. htm. (132 pages).
Hewson et al., "Taste-aroma interactions in a citrus flavoured model beverage system: Similarities and differences between acid and sugar type", Food Quality and Preference, 2008, pp. 323-334.
Zheng Dijun et al., "Study Development of Natural and Synthesized Sweeteners and Evaluation thereof (2)", Pharmacy Intelligence Communication, vol. 8, No. 4, 1990.
Labbe et al., "Subthreshold Olfactory Stimulation Can Enhance Sweetness", Chemical Senses, 2007, pp. 205-214.
Marshall et al., "The Capacity of Humans to Identify Components in Complex Odor-taste Mixtures", Chemical Senses, 2006, pp. 539-545.
Martin, "Sweet/sour balance in champagne wine and dependence on taste/odour interactions", Food Quality and Preference, 2002, pp. 295-305.
Meilgaard MC, Civille GV, and Carr BT (2007). Sensory Evaluations Techniques, CRC Press, Boca Raton, FL.
Mohamed A. Ibrahim et al.: "Minor Diterpene Glycosides from the Leaves of Stevia rebaudiana", Journal of Natural Products., vol. 77, No. 5, Apr. 23, 2014 (2014-04-23), pp. 1231-1235, XP055340471, US Issn: 0163-3864, DOI: 10.1021 /np4009656.
Nobel, "Taste-aroma interactions", Trends in Food Science & Technology, 1996, pp. 439-444.
Ohta et al., "Characterization of Novel Steviol Glycosides from Leaves of Stevia rebaudiana Morita," 2010, J. Appl. Glycosci., 57, 199-209.
Pfeiffer et al., "Temporal Synchrony and Integration of Subthreshold Taste and Smell Signals", Chemical Senses, 2005, pp. 539-545.
Plotto et al. "Specific anosmia observed for B-ionone, but not for a-ionone: significance for flavor research", Journal of food science, 2006, pp. 401-406.
Ppm to percent conversion: retrieved on Oct. 21, 2019 (Year: 2019).
Prescott et al., "Odor-Taste Interactions: Effects of Attentional Strategies during Exposure", Chemical Senses, 2004, pp. 331-340.
Prescott, "Flavour as a psychological construct: implications for perceiving and measuring the sensory qualities of foods", Food Quality and Preference, 1999, pp. 349-356.
Schifferstein et al., "The role of congruency and pleasantness in odor-induced taste enhancement", Acta Psychologica, 1996, pp. 87-105.
Schiffman, et al., "Effect of Repeated Presentation of Sweetness Intensity of Binary and Ternary Mixtures of Sweeteners", Chem. Senses 28: 219-229, 2003.
Schiffman, et al., "Investigation of Synergism in Binary Mixtures of Sweeteners", Brain Research Bulletin, vol. 38, No. 2, pp. 105-120, 1995.
Schiffman, et al., "Synergism among Ternary Mixtures of Fourteen Sweeteners", Chem. Senses 25: 131-140, 2000.
Small et al., "Experience-Dependent Neural Integration of Taste and Smell in the Human Brain", Journal of Neurophysiology, 2004, pp. 1892-1903.
Stevioside vs Rebaudiosides: Clearing Up the Confusion; Stevia Canada 2002.
Wako Chemicals GmbH: Rebaudioside B Standard and Rebaudioside D Standard, copyright 2016, at https://www. wako-chemicals.de/en/product rebaudioside-d-standard and https://www.wako-chemicals.de/en/product/rebaudioside- b-standard, printed Nov. 9, 2017.
White et al. "Chemosensory Cross-Modal Stroop Effects: Congruent Odors Facilitate Taste Identification", Chemical Senses, 2007, pp. 337-341.

* cited by examiner

GLYCOSIDE COMPOSITIONS

CROSS-REFERENCE TO RELATED APPLICATIONS

This application is a Continuation of U.S. patent application Ser. No. 15/575,719, filed Nov. 20, 2017, which is a national phase of International Patent Application No. PCT/US2016/033564, filed May 20, 2016, which claims priority to U.S. Provisional Patent Application No. 62/164,191 filed May 20, 2015, each of which are hereby incorporated by reference in their entirety.

FIELD OF THE DISCLOSURE

The present disclosure relates to sweetener compositions comprising glycosides. The sweetener compositions of the present disclosure further comprise other ingredients, such as one or more bulking agents. The present disclosure also relates to incorporation of the sweetener compositions into foods and/or beverages.

BACKGROUND

The species *Stevia rebaudiana* ("*Stevia*") is widely grown for its naturally-occurring sweet glycosides. Sweet glycosides can be extracted from *Stevia* using known methods and processes. The glycosides of *Stevia* may be used as non-caloric sweeteners.

SUMMARY

The present disclosure relates to sweetener compositions comprising glycosides. The sweetener compositions of the present disclosure may also include other ingredients such as bulking agents, flavorings, other high intensity sweeteners, or the like. The present disclosure also pertains to the use of the sweetener compositions in foods and beverages.

Mixtures of particular glycosides at certain ratios result in sweetener compositions that have effective sweetening ability when compared to rebaudioside D and/or rebaudioside M. Additionally, some compositions have reduced bitterness (while attaining the same or higher sweetness) than rebaudioside D and/or rebaudioside M.

The disclosed sweetener compositions containing glycosides of rebaudioside D and/or rebaudioside M combined with rebaudioside E, rebaudioside G, rebaudioside N and/or rebaudioside O can result in compositions having an improved effective sweetening ability when compared to rebaudioside D alone or rebaudioside M alone.

In other embodiments, the disclosed sweetener compositions containing glycosides of rebaudioside D and/or rebaudioside M when combined with rebaudioside E, rebaudioside G, rebaudioside N and/or rebaudioside O were found to have a measured sweetness/bitterness ratio (S/B) better than a predicted sweetness/bitterness ratio. In other embodiments, the disclosed sweetener compositions containing glycosides of rebaudioside D and/or rebaudioside M when combined with rebaudioside E, rebaudioside G, rebaudioside N and/or rebaudioside O showed a difference of at least 0.10 between a measured sweetness/bitterness ratio and a predicted sweetness/bitterness ratio. Thus, the disclosed sweetener compositions widen the glycoside options that may be used in sweetener compositions.

The phrase "glycoside composition" as used herein means a composition of the various glycosides obtained from the *stevia* plant and their related isomers (e.g. natural or synthetic). These glycosides include, but are not limited to, rebaudioside A, B, C, D, E, F, G, H, I, J, K, L, M, N, or O, stevioside, dulcoside, steviobioside, and rubusoside. In some embodiments, the glycoside compositions of the present disclosure include compositions including rebaudioside D, rebaudioside M, or a combination of rebaudioside D and rebaudioside M, further in combination with other glycosides such as rebaudioside E, rebaudioside G, rebaudioside N, and rebaudioside O.

The terms "rebaudioside DM", "Reb DM", and variations thereof, as used herein, refer to a sweetener composition in which the glycosides in the composition are primarily rebaudioside D and rebaudioside M (hence, the "DM"), their related isomers (e.g., natural or synthetic), and/or salts thereof. This terminology format may be used for compositions having any other combination of glycosides, for example, but not limited to Reb DMO, Reb NO, Reb DE, and the like.

The terms "sweetness" as used herein means glycoside compositions which exhibit measured or predicted equivalent or greater sweetness than rebaudioside D and/or rebaudioside M alone. Sweetness may also be determined by measuring sucrose equivalent values (SEV) using methods and processes well known to those skilled in the art. For example, SEV may be determined by measuring sweetness equivalence to a reference sucrose solution as described in Example 1. Typically, taste panelists are trained to detect and scale sweetness of reference sucrose solutions containing between 10 gm to 150 g/kg sucrose. The sweetener compositions containing the glycosides (e.g., rebaudioside D, M, G, O, N and/or E) are then tasted at a series of dilutions to determine the concentration of the sweetener composition that is as sweet as a given sucrose reference. For example, if a sweetener composition is as sweet as 50 g/kg of sucrose solution in a citric acid buffer, pH 3.1, then the sweetener composition is assigned a SEV of 5. See Table 1 for the reference standards and Example 1 for how the reference standard is set and evaluated. The term "sweetness value" is used interchangeably herein with "SEV".

The term "bitterness" as used herein means glycoside compositions which exhibit measured or predicted equivalent or reduced bitterness than rebaudioside D and/or rebaudioside M alone. Bitterness may also be determined by measuring caffeine equivalent values using methods and processes well known to those skilled in the art. For example, bitterness may be determined by measuring bitterness equivalence to a reference caffeine solution as described in Example 1. Typically, taste panelists are trained to detect and scale bitterness of reference caffeine solutions containing between 0.1 gm to 0.8 gms/kg caffeine. The sweetener compositions containing the glycosides (e.g., rebaudioside D, M, G, O, N and/or E) are then tasted at a series of dilutions to determine the concentration of the sweetener composition that is as bitter as a given caffeine reference. For example, if a sweetener composition is as bitter as 0.3 g/kg of caffeine solution, then the sweetener composition is assigned a bitterness of 5. See Table 1 for the reference standards and Example 1 for how the reference standard is set and evaluated.

The phrase "sweetness/bitterness ratio (S/B)" as used herein means a ratio of either i) a measured sweetness and bitterness ratio of averaged sweetness values over averaged bitterness values (measured sweetness value/measured bitterness value), or a predicted sweetness/bitterness ratio of predicted sweetness values over predicted bitterness values (predicted sweetness value/predicted bitterness value). Both measured and predicted S/B ratios are described and exemplified below.

A sweetener composition having "effective sweetening ability" means that the sweetener composition has at least comparable or equivalent sweetness, or has higher or increased sweetness when compared to rebaudioside D or rebaudioside M alone, or rebaudioside DM, at equivalent concentrations. Sweetness can be determined by measuring sucrose equivalent (SEV). In some embodiments, effective sweetening ability can mean that a certain sucrose equivalent (SEV) can be achieved by a particular sweetener composition that includes rebaudioside D and/or rebaudioside M with other glycosides such as rebaudioside E, rebaudioside G, rebaudioside N, and rebaudioside O.

In one embodiment, a sweetener composition comprises a glycoside composition where the glycoside composition includes a mixture of rebaudioside D and rebaudioside M and at least one other glycoside selected from the group consisting of rebaudioside E, rebaudioside G, rebaudioside N and rebaudioside O. Still other sweetener compositions include glycosides that include rebaudioside D and at least one other glycoside selected from the group consisting of rebaudioside E, rebaudioside G, rebaudioside N and rebaudioside O. Other embodiments include sweetener compositions that include glycosides such as rebaudioside M and at least one other glycoside selected from the group consisting of rebaudioside E, rebaudioside G, rebaudioside N and rebaudioside O.

In still other embodiments, the sweetener composition includes glycosides selected from rebaudioside E, rebaudioside G, rebaudioside N and/or rebaudioside O or combinations thereof.

In other embodiments, the disclosed combinations of glycosides in the sweetener compositions may further include a bulking agent. The disclosed sweetener compositions can be used in food and beverage compositions.

DETAILED DESCRIPTION

The embodiments of the invention described here are not intended to be exhaustive or to limit the description to the precise forms disclosed in the following detailed description. Rather, the embodiments are chosen and described so that others skilled in the art can appreciate and understand the principles and practices of the description.

All publications and patents mentioned here are hereby incorporated by reference in their entirety. The publications and patents disclosed here are provided solely for their disclosure.

Unless otherwise mentioned, all parts and percentages are by weight.

Disclosed are sweetener compositions including a combination of glycosides, such as rebaudioside D, rebaudioside M, or Reb DM combined with other glycosides such as rebaudioside E, rebaudioside G, rebaudioside N and/or rebaudioside O, that result in compositions which exhibit equivalent or greater effective sweetening ability and/or equivalent or reduced bitterness than rebaudioside D and/or rebaudioside M alone. That is, the same level of sweetness, if not better, may be achieved with different combinations of other glycosides than with only rebaudioside D, rebaudioside M or a combination of rebaudioside D and rebaudioside M.

In some embodiments, the added benefit of reduced bitterness (while attaining the same sweetness) is also achieved with these disclosed glycoside compositions.

These benefits are particularly surprising given that rebaudioside D and rebaudioside M are thought to be particularly sweet glycosides with low levels of bitterness.

Additionally, or alternatively, certain sweetener compositions of this disclosure may provide decreased bitterness compared to rebaudioside D and/or rebaudioside M alone.

In some embodiments, the disclosed sweetener compositions can provide sweetness/bitterness ratios (S/B) similar or better than predicted sweetness/bitterness ratios (S/B). In some embodiments, the disclosed sweetener compositions can have sweetness/bitterness ratios (S/B) ratios that are greater than the sweetness/bitterness ratios (S/B) for compositions containing rebaudioside D and/or rebaudioside M.

Applicants have surprisingly discovered that certain sweetener combinations including glycosides such as rebaudioside D and/or rebaudioside M, in binary and ternary forms, result in compositions which have similar or higher sweetness or SEV than the individual glycosides of which the compositions are made of. That is, the same sweetness level can be achieved with a lower glycoside concentration than the amount that would be needed with the individual component such as rebaudioside D, rebaudioside M, or other glycosides. The reduction in glycoside concentration needed to achieve a certain sweetness or bitterness level can result in cost savings by allowing the utilization of lower glycoside amounts in a sweetener composition yet achieving the same sweetness level. Additionally, lower glycoside levels could allow for easier incorporation into certain foods and beverages. In some embodiments, the added benefit of reduced bitterness (while attaining the same or similar sweetness) is also achieved.

The chemical structures of rebaudioside D and rebaudioside M are well known in the art. The chemical structure of these compounds is also found in international Application Publication Nos. WO2012/082677 and WO2014/052457, which are both incorporated herein by reference.

Structurally, steviol glycosides have a central molecular moiety, which is a single steviol base, and glucopyranosyl residues attached to the C13 and/or C19 atoms of the steviol base, according to the atom numbering on the base shown below. That is, glucopyranosyl residues represent groups $R_1$ and $R_2$ in the following formula:

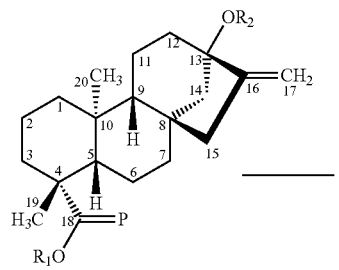

Table A below shows the various steviol glycosides and the corresponding $R_1$ and $R_2$ groups:

TABLE A

| Compound name | $R_1$ (C-19) | $R_2$ (C-13) |
| --- | --- | --- |
| Steviol | H | H |
| Stevioside | β-Glu | β-Glu-β-Glu (2->1) |
| Rebaudioside A | β-Glu | β-Glu-β-Glu (2->1)<br>\|<br>β-Glu (3->1) |

TABLE A-continued

| Compound name | $R_1$ (C-19) | $R_2$ (C-13) |
|---|---|---|
| Rebaudioside B | H | β-Glu-β-Glu (2->1)<br>\|<br>β-Glu (3->1) |
| Rebaudioside C | β-Glu | β-Glu-α-Rha (2->1)<br>\|<br>β-Glu (3->1) |
| Rebaudioside D | β-Glu-β-Glu (2->1) | β-Glu-β-Glu (2->1)<br>\|<br>β-Glu (3->1) |
| Rebaudioside E | β-Glu-β-Glu (2->1) | β-Glu-β-Glu (2->1) |
| Rebaudioside G | β-Glu | β-Glu-β-Glu (3->1) |
| Rebaudioside M | β-Glu-β-Glu (2->1)<br>\|<br>β-Glu (3->1) | β-Glu-β-Glu (2->1)<br>\|<br>β-Glu (3->1) |
| Rebaudioside N | β-Glu-α-Rha (2->1)<br>\|<br>β-Glu (3->1) | β-Glu-β-Glu (2->1)<br>\|<br>β-Glu (3->1) |
| Rebaudioside O | β-Glu-α-Rha (2->1)-β-Glu (3->1)<br>\|<br>β-Glu (3->1) | β-Glu-β-Glu (2->1)<br>\|<br>β-Glu (3->1) |

Glu: glucose
Rha: rhamnose

The sweetener compositions include other glycosides in addition to Reb DM, Reb D or Reb M. The other glycosides, for example, include rebaudioside E, rebaudioside G, rebaudioside N and rebaudioside O. These other glycosides when combined with Reb DM or Reb D or Reb M show compositions having an effective sweetening ability compared to Reb D Reb M alone. In some embodiments, the sweetener compositions include Reb DM glycosides with Reb N and Reb O (Reb DMNO). In other embodiments, the sweetener compositions include glycosides Reb DM with rebaudioside N or rebaudioside O (Reb DMN or Reb DMO). In still other embodiments, the sweetener compositions may include Reb DM with Reb E, Reb G, Reb O, Reb N or combinations thereof.

In some embodiments, the sweetener composition may include Reb DN, Reb DO, and Reb DNO. In other embodiments, the sweetener composition may include Reb D with Reb N, Reb O, Reb G, Reb E and combinations thereof. In some embodiments, the sweetener composition may include Reb DM with Reb N, Reb O, Reb G, Reb E and combinations thereof.

In some embodiments, the sweetener composition may include Reb MN, Reb MO, and Reb MNO. In other embodiments, the sweetener composition may include Reb M with Reb N, Reb O, Reb G, Reb E and combinations thereof. In some embodiments, the sweetener composition includes Reb DMNOEG.

In still other embodiments, the sweetener compositions may include Reb A, or Reb B, or Reb AB in combination with Reb DG, DO, DN or DE (i.e., 12 different combinations), Reb A, or Reb B, or Reb AB in combination with Reb MG, MO, MN or ME (i.e., 12 different combinations), Reb A, or Reb B, or Reb AB in combination with Reb DMG, Reb DMO, Reb DMN, or Reb DME (i.e., 12 different combinations), or Reb A, or Reb B, or Reb AB in combination with Reb DMGONE (i.e., 3 different combinations).

In still other embodiments, the sweetener compositions may include Reb A, or Reb B, or Reb AB in combination with Reb DG, DO, DN or DE. These 12 different combinations include Reb ADG, Reb ADO, Reb ADN or Reb ADE, Reb BDG, Reb BDO, Reb BDN or Reb BDE, Reb ABDG, Reb ABDO, Reb ABDN or Reb ABDE. Other sweetener combinations may include Reb A, or Reb B, or Reb AB in combination with Reb MG, MO, MN or ME. These 12 different combinations include Reb AMG, Reb AMO, Reb AMN or Reb AME, Reb BMG, Reb BMO, Reb BMN or Reb BME, Reb ABMG, Reb ABMO, Reb ABMN or Reb ABME. Other sweetener combinations may include Reb A, or Reb B, or Reb AB in combination with Reb DMG, Reb DMO, Reb DMN, or Reb DME. These 12 different combinations include Reb ADMG, Reb ADMO, Reb ADMN, Reb ADME, Reb BDMG, Reb BDMO, Reb BDMN, Reb BDME, Reb ABDMG, Reb ABDMO, Reb ABDMN, or Reb ABDME. Still other sweetener combinations may include Reb A, or Reb B, or Reb AB in combination with Reb DMGONE. These 3 different combinations include Reb ADMGONE, Reb BDMGONE, or Reb ABDMGONE.

In some embodiments, the sweetener composition may include Reb G and/or Reb E in combination with Reb N and/or O. In still other embodiments, the sweetener composition may include Reb G and Reb E.

In some embodiments, the sweetener composition may include a ratio of rebaudioside O to the total of rebaudioside D and rebaudioside M (% rebaudioside O/(% rebaudioside D+% rebaudioside M)) in the range of about 0.05 to 3.5, about 0.2 to 3, or about 0.3 to 1. In some embodiments, the sweetener composition has a ratio of rebaudioside O to the total of rebaudioside D and rebaudioside M (% rebaudioside O/(% rebaudioside D+% rebaudioside M)) of at least about 0.1, 0.15, 0.2, 0.25, 0.3, 0.33, 0.4, 0.5, 0.67, 0.75, 1, 1.5, 2, 2.5, 3, or 3.4.

In some embodiments, the sweetener composition may include a ratio of rebaudioside N to the total of rebaudioside D and rebaudioside M (% rebaudioside N/(% rebaudioside D+% rebaudioside M)) in the range of 0.05 to 3.5, about, about 0.2 to 3, or about 0.3 to 1. In some embodiments, the sweetener composition has a ratio of rebaudioside N to the total of rebaudioside D and rebaudioside M (% rebaudioside N/(% rebaudioside D+% rebaudioside M)) of at least about 0.1, 0.15, 0.2, 0.25, 0.3, 0.33, 0.4, 0.5, 0.67, 0.75, 1, 1.5, 2, 2.5, 3, or 3.4.

In some embodiments, the sweetener composition may include a ratio of rebaudioside G to the total of rebaudioside D and rebaudioside M (% rebaudioside G/(% rebaudioside D+% rebaudioside M)) in the range of 0.05 to 3.5, about, about 0.2 to 3, or about 0.3 to 1. In some embodiments, the sweetener composition has a ratio of rebaudioside G to the total of rebaudioside D and rebaudioside M (% rebaudioside G/(% rebaudioside D+% rebaudioside M)) of at least about 0.1, 0.15, 0.2, 0.25, 0.3, 0.33, 0.4, 0.5, 0.67, 0.75, 1, 1.5, 2, 2.5, 3, or 3.4.

In some embodiments, the sweetener composition may include a ratio of rebaudioside E to the total of rebaudioside D and rebaudioside M (% rebaudioside E/(% rebaudioside D+% rebaudioside M)) in the range of 0.05 to 3.5, about, about 0.2 to 3, or about 0.3 to 1. In some embodiments, the sweetener composition has a ratio of rebaudioside E to the total of rebaudioside D and rebaudioside M rebaudioside E/(% rebaudioside D+% rebaudioside M)) of at least about 0.1, 0.15, 0.2, 0.25, 0.3, 0.33, 0.4, 0.5, 0.67, 0.75, 1, 1.5, 2, 2.5, 3, or 3.4.

In some embodiments, the rebaudioside content of the sweetener composition is at least 20%, 25%, 10%, 35%, 40%, 45%, 50%, 55%, 60%, 65%, 70%, 75%, 80%, 85%, 90%, 95%, 99%, or 99.5% of the total sweetener composition. In some embodiments, in a sweetener composition containing Reb DM, the combination of rebaudioside D and rebaudioside M can make up at least 20%, 25%, 30%, 35%, 40%, 45%, 50%, 55%, 60%, 65%, 70%, 75%, 80%, 85%, 90%, 95%, 99%, or 99.5% of the total sweetener composition.

The ratio of the rebaudioside D to rebaudioside M in the various disclosed glycoside compositions can range from 1:1 to 2:3; in other embodiments may be 1:1, 1:2, 1:5, 1:10 or 2:3. In still other embodiments, the ratio of the rebaudioside D to rebaudioside M can range from 1:3 to 1:4 or from 3:1 to 4:1.

In some embodiments of the sweetener compositions, the rebaudioside D content can be from about 5-85 wt % of the total sweetener composition, 10-80 wt %, 20-70 wt %, 30-60 wt %, or 40-50 wt % of the total sweetener composition. In some embodiments, rebaudioside D can be 50 wt % of the total sweetener composition.

In some embodiments of the sweetener compositions, the rebaudioside M content can be from about 5-85 wt % of the total sweetener composition, 10-80 wt %, 20-70 wt %, 30-60 wt %, or 40-50 wt % of the total sweetener composition. In some embodiments, rebaudioside D can be 50 wt % of the total sweetener composition.

In some embodiments of the sweetener compositions, the rebaudioside G content can be from about 5-85 wt % of the total sweetener composition, 10-80 wt %, 20-70 wt %, 30-60 wt %, or 40-50 wt % of the total sweetener composition. In some embodiments, rebaudioside G can be 50 wt % of the total sweetener composition.

In some embodiments of the sweetener compositions, the rebaudioside O content can be from about 5-85 wt % of the total sweetener composition, 10-80 wt %, 20-70 wt %, 30-60, or 40-50 wt % wt % of the total sweetener composition. In some embodiments, rebaudioside O can be 50 wt % of the total sweetener composition.

In some embodiments of the sweetener compositions, the rebaudioside N content can be from about 5-85 wt % of the total sweetener composition, 10-80 wt %, 20-70 wt %, 30-60 wt %, or 40-50 wt % of the total sweetener composition. In some embodiments, rebaudioside N can be 50 wt % of the total sweetener composition.

In some embodiments of the sweetener compositions, the rebaudioside E content can be from about 5-85 wt % of the total sweetener composition, 10-80 wt %, 20-70 wt %, 30-60 wt %, or 40-50 wt % of the total sweetener composition. In some embodiments, rebaudioside E can be 50 wt % of the total sweetener composition.

The sweetener composition can include Reb DM with other glycosides that include rebaudioside D from about 10 wt % to 45 wt % of the sweetener composition. In other embodiments, the sweetener composition can include Reb DM with other glycosides that include rebaudioside M from about 10 wt % to 45 wt % of the sweetener composition. In still other embodiments, the Reb DM can include rebaudioside DM from about 20 wt % to 90 wt % of the sweetener composition.

In some embodiments, the concentration of any single rebaudioside can be expressed as a wt % of the total glycoside concentration instead of as a wt % of the total sweetener composition to account for various additives that can be included in the sweetener composition. In some embodiments of the sweetener composition, the rebaudioside D content can be about 5-85 wt % of the total glycoside concentration, 10-80 wt %, 20-70 wt %, 30-60 wt %, or 40-50 wt % of the total glycoside concentration. In some embodiments, rebaudioside D can be 50 wt % of the total glycoside concentration.

In some embodiments of the sweetener composition, the rebaudioside M content can be about 5-85 wt % of the total glycoside concentration, 10-80 wt %, 20-70 wt %, 30-60 wt %, or 40-50 wt % of the total glycoside concentration. In some embodiments, rebaudioside M can be 50 wt % of the total glycoside concentration.

In some embodiments of the sweetener composition, the rebaudioside G content can be about 5-85 wt % of the total glycoside concentration, 10-80 wt %, 20-70 wt %, 30-60 wt %, or 40-50 wt % of the total glycoside concentration. In some embodiments, rebaudioside G can be 50 wt % of the total glycoside concentration.

In some embodiments of sweetener composition, the rebaudioside O content can be about 5-85 wt % of the total glycoside concentration, 10-80 wt %, 20-70 wt %, 30-60, or 40-50 wt % of the total glycoside concentration. In some embodiments, rebaudioside O can be 50 wt % of the total glycoside concentration.

In some embodiments of the sweetener composition, the rebaudioside N content can be about 5-85 wt % of the total glycoside concentration, 10-80 wt %, 20-70 wt %, 30-60 wt %, or 40-50 wt % of the total glycoside concentration. In some embodiments, rebaudioside N can be 50 wt % of the total glycoside concentration.

In some embodiments of the sweetener composition, the rebaudioside E content can be from about 5-85 wt % of the total glycoside concentration, 10-80 wt %, 20-70 wt %, 30-60 wt %, or 40-50 wt % of the total glycoside concentration. In some embodiments, rebaudioside E can be 50 wt % of the total glycoside concentration.

The sweetener composition can include Reb DM with other glycosides that include rebaudioside D from about 10 wt % to 45 wt % of the glycoside concentration. In other embodiments, the sweetener composition can include Reb DM with other glycosides that include rebaudioside M from about 10 wt % to 45 wt % of the total glycoside concentration. In still other embodiments, the Reb DM can include rebaudioside DM from about 20 wt % to 90 wt % of the total glycoside concentration.

The term "Reb Component" as used herein refers to the rebaudioside components consisting of one or more of Reb, D, Reb M, Reb G, Reb O, Reb N, and/or Reb E. In some embodiments, the concentration of any single rebaudioside can be expressed as a wt % of the Reb Component instead of as a wt % of the total sweetener composition or glycoside composition to account for various additives that can be included in the sweetener composition or to account for the inclusion of glycosides other than Reb, D, Reb M, Reb G, Reb O, Reb N, and/or Reb E. In some embodiments of the sweetener composition, the rebaudioside D content can be about 5-85 wt % of the rebaudioside components consisting of one or more of Reb, D, Reb M, Reb G, Reb O, Reb N, and/or Reb E ("Reb Component(s)"), 10-80 wt %, 20-70 wt %, 30-60 wt %, or 40-50 wt % of the Reb Component(s). In some embodiments, rebaudioside D can be 50 wt % of the Reb Component(s).

In some embodiments of the sweetener composition, the rebaudioside M content can be about 5-85 wt % of the Reb Component(s), 10-80 wt %, 20-70 wt %, 30-60 wt %, or 40-50 wt % of the Reb Component(s). In some embodiments, rebaudioside M can be 50 wt % of the Reb Component(s).

In some embodiments of the sweetener composition, the rebaudioside G content can be about 5-85 wt % of the Reb Component(s), 10-80 wt %, 20-70 wt %, 30-60 wt %, or 40-50 wt % of the Reb Component(s). In some embodiments, rebaudioside G can be 50 wt % of the Reb Component(s).

In some embodiments of sweetener composition, the rebaudioside O content can be about 5-85 wt % of the Reb Component(s), 10-80 wt %, 20-70 wt %, 30-60, or 40-50 wt % of the Reb Component(s). In some embodiments, rebaudioside O can be 50 wt % of the Reb Component(s).

In some embodiments of the sweetener composition, the rebaudioside N content can be about 5-85 wt % of the Reb Component(s), 10-80 wt %, 20-70 wt %, 30-60 wt %, or 40-50 wt % of the Reb Component(s). In some embodiments, rebaudioside N can be wt % of the Reb Component(s).

In some embodiments of the sweetener composition, the rebaudioside E content can be about 5-85 wt % of the Reb Component(s), 10-80 wt %, 20-70 wt %, 30-60 wt %, or 40-50 wt % of the Reb Component(s). In some embodiments, rebaudioside E can be 50 wt % of the Reb Component(s).

The sweetener composition can include Reb DM with other glycosides that include rebaudioside D from about 10 wt % to 45 wt % of the Reb Component(s). In other embodiments, the sweetener composition can include Reb DM with other glycosides that include rebaudioside M from about 10 wt % to 45 wt % of the total Reb Component(s). In still other embodiments, the Reb DM can include rebaudioside DM from about 20 wt % to 90 wt % of the Reb Component(s).

The sweetener composition can also include rebaudioside D with other glycosides that includes rebaudioside D from about 15 wt % to 75 wt % or from 25 wt % to 50 wt % of the sweetener composition. In other embodiments, the sweetener composition can include Reb M with other glycosides that includes rebaudioside M from about 15 wt % to 75 wt % or from 25 wt % to 50 wt % of the sweetener composition.

The sweetener composition can include 10-50 wt % rebaudioside D, 15-50 wt % rebaudioside M, and 15-80 wt % rebaudioside N. In other embodiments, the sweetener composition includes the glycosides from 10-50 wt % rebaudioside D, 15-50 wt % rebaudioside M, and 15-80 wt % rebaudioside O.

In some embodiments, the disclosed sweetener compositions can be in an amount of about 80 to about 1500 ppm, about 100 to 1100 ppm, about 200 to 900 ppm, or about 400 to 600 ppm of a beverage or food composition. In some embodiments, the glycoside content of the sweetener composition can be in an amount of about 80 to about 1500 ppm, about 100 to 1100 ppm, about 200 to 900 ppm, or about 400 to 600 ppm of a beverage or food composition. That is, regardless of the other ingredients included in the sweetener composition, the amount of glycosides in the beverage or food composition can be in an amount of about 80 to about 1500 ppm, about 100 to 1100 ppm, about 200 to 900 ppm, or about 400 to 600 ppm. In some embodiments, the total rebaudioside content of the sweetener composition can be in an amount of about 80 to about 1500 ppm, about 100 to 1100 ppm, about 200 to 900 ppm, or about 400 to 600 ppm of a beverage or food composition, in some embodiments, the amount of Reb Component(s), as defined herein, of the sweetener composition can be in an amount of about 80 to about 1500 ppm, about 100 to 1100 ppm, about 200 to 900 ppm, or about 400 to 600 ppm of a beverage or food composition.

In other embodiments, the Reb D and Reb M can each be in an amount of 400 to 600 ppm of the beverage or food composition. In other embodiments, the beverage or food composition can contain Reb D and/or Reb M in combination with Reb G, O, N, and/or E in an amount of 400 to 600 ppm of the beverage or food composition. In still other embodiments, the beverage or food composition can contain Reb D and/or Reb M in combination with Reb G, O, N, and/or E in an amount of 400 and 600 ppm of the beverage or food composition.

The disclosed sweetener compositions, glycoside compositions, or Reb Component(s) can be used in a beverage, a citric acid buffer at pH 3.1, or an aqueous solution that results in the beverage, a citric acid buffer at pH 3.1, or an aqueous solution having a certain SEV or sweetness value, a certain bitterness value, or a certain S/B ratio. In some embodiments, the disclosed sweetener compositions can provide a sweetness value (SEV) in the range of 6.0 to 10 in a beverage, a citric acid buffer at pH 3.1, or an aqueous solution containing the disclosed sweetener composition at a concentration of 400 or 600 ppm of the rebaudioside component and/or a bitterness value in the range of about 2.5 to 3.5 of a beverage, a citric acid buffer at pH 3.1, or an aqueous solution containing the disclosed sweetener composition. In still other embodiments, the disclosed sweetener compositions can provide a sweetness value (SEV) of about 6.2, 6.4, 6.6, 6.8, 7, 7.2, 7.4, 7.6, 7.8, 8, 8.2, 8.4, 8.6, 8.8, 9, 9.2, 9.4, 9.6, 9.8, or 10 in a beverage, a citric acid buffer at pH 3.1, or an aqueous solution containing the disclosed sweetener composition at a concentration of 400 or 600 ppm of the rebaudioside component and/or a bitterness value in the range of about 2.5, 2.7, 2.9, 3.1, 3.3 or 3.5 in a beverage, a citric acid buffer at pH 3.1, or an aqueous solution containing the disclosed sweetener composition In some embodiments, the disclosed sweetener compositions can provide a sweetness value (SEV) in the range of 6.7 to 8.9, 7.0 to 8.6, or 7.3 to 8.3 in a beverage, a citric acid buffer at pH 3.1, or an aqueous solution containing the disclosed sweetener composition at a concentration of 400 or 600 ppm of the rebaudioside component and/or a bitterness value in the range of about 2.5 to 3.5, 2.7 to 3.3, or 2.9 to 3.1 in a beverage, a citric acid buffer at pH 3.1, or an aqueous solution containing the disclosed sweetener composition. In some embodiments, the disclosed sweetener compositions can provide an improved sweetness value and/or reduced bitterness value than 400 ppm to 600 ppm of Reb M or 400 ppm to 600 ppm of Reb D. In some embodiments, the disclosed sweetener compositions can provide a higher sweetness value and/or a reduced bitterness value than 400 ppm or 600 ppm of Reb M, or a higher sweetness value and/or a reduced bitterness value than 400 ppm or 600 ppm of Reb D. In still other embodiments, the disclosed sweetener compositions can provide a sweetness value greater than or equal to 8.3 of a beverage, a citric acid buffer at pH 3.1, or an aqueous solution and/or bitterness value less than or equal to 3.3 of a beverage, a citric acid buffer at pH 3.1, or an aqueous solution than 600 ppm Reb M. In other embodiments, the disclosed sweetener composition can provide a sweetness value greater than or equal to 7.3 and/or bitterness value less than or equal to 3.3 than 400 ppm Reb M. In other embodiments, the disclosed sweetener compositions can provide a sweetness value greater than or equal to 8 and/or bitterness value less than or equal to 3.1 than 600 ppm Reb D. In other embodiments, the disclosed sweetener compositions can provide a sweetness value greater than or equal to 6.3 and/or bitterness value less than or equal to 3 than 400 ppm Reb D.

The other glycosides in the various disclosed sweetener combinations of Reb DM, Reb D, and Reb M include about 15-85%, 17-50% of the glycoside composition, or 25-34 wt % of the glycoside composition.

The disclosed sweetener compositions can also be combined at ratios or weight percentages to provide a measured or actual sweetness/bitterness ratio (S/B) that is better than the predicted sweetness/bitterness ratio (S/B). How the predicted S/B ratio is computed is discussed in detail in Example 2. Briefly, the sweetness and bitterness values of various individual rebaudiosides at a particular concentration (ppm) are determined and shown in Table 7. To compute the predicted glycoside composition containing, for example, Reb DMN, one can use the below Formula 1:

((wt % of D in the total sweetener composition×D's sweetness ratio from Table 7)+(wt % of M in the total sweetener composition×M's sweetness ratio from Table 7)+(wt % of N in the sweetener composition×N's sweetness ratio from Table 7)/100

Using Formula 1 and Table 7, the predicted sweetness ratios for DMN=7.42

(41.6×7.08)+(41.6×7.76)+(16.79×7.44)/100

(294.5+322.8+124.9)/100=742.2/100=7.42

Likewise, using Formula 1 and Table 7, the predicted bitterness ratios for DMN can be computed. Using Formula 1 and Table 7, the predicted sweetness and bitterness ratios may also be computed for any glycoside combination selected from rebaudioside D, rebaudioside M, rebaudioside G, rebaudioside O, rebaudioside N and rebaudioside E.

In some embodiments, the measured S/B ratios are better than the predicted S/B ratios compared at 400 ppm and/or 600 ppm concentrations. The measured S/B ratios can range from 1.1 to 3.2. The sweetener compositions can have sweetness/bitterness ratio (S/B) from about 1.1 to about 3.2 when the composition is in beverage, citric acid buffer at pH 3.1 or aqueous solution at a concentration of 400 ppm. In other embodiments, the sweetener composition can have sweetness/bitterness ratio (S/B) from about 1.1 to about 3.2 when the composition is in beverage, citric acid buffer at pH 3.1 or aqueous solution at a concentration of 600 ppm.

Combinations of sweetener compositions that show an actual or measured sweetness/bitterness ratio (S/B) that is better than the predicted sweetness/bitterness ratios (S/B) are shown in Example 2. They include the combination of at least one of rebaudioside D and rebaudioside M, and at least one of rebaudioside O and rebaudioside N, wherein a weight ratio of the total of rebaudioside O and rebaudioside N to the total of rebaudioside D and rebaudioside M is greater than 0.1. In some embodiments, the sweetener composition can include a combination of at least one of rebaudioside D and rebaudioside M, and at least one of rebaudioside O and rebaudioside N, wherein a weight ratio of the total of rebaudioside O and rebaudioside N to the total of rebaudioside D and rebaudioside M is greater than 0.2, 0.3, 0.4, 0.5, 0.6, 0.7, 0.8, 0.9, 1, 1.5, 2, 2.5, or 3.

In other embodiments, the sweetener compositions that show measured S/B ratios that are better than the predicted S/B ratios include combinations of Reb D and/or Reb M with Reb O, Reb N, Reb E and/or Reb G. In still other embodiments, the sweetener composition can include Reb G and/or Reb E, Reb N and/or Reb O.

In other embodiments, the rebaudioside D can range from 20 ppm to 510 ppm of the sweetener composition. Similarly, Reb M, Reb G, Reb O, Reb N and Reb E can each range from 20 ppm to 510 ppm in the sweetener composition.

The combination of two rebaudiosides can show better actual or measured S/B ratios over predicted S/B ratios. In some embodiments, the combination of two rebaudiosides in the sweetener composition include DM, DO, DN, MO, MN and GE at 400 pm. In other embodiments, the combination of two rebaudiosides in a sweetener composition can include DM, DN, MO, MN, GE at 600 pm. The two rebaudioside selected from D, M, G, O, N and E in such combinations range from 20-80 wt % of the sweetener composition, from 25-75 wt % or 50 wt % of the total sweetener composition. In some embodiments the ratio of the selected two rebaudiosides can be from 1:4 to 4:1. In some embodiments, the ratio of the two selected rebaudiosides can be from 1:4, 1:3 to 1:1.

A combination of three rebaudiosides can show better actual or measured S/B ratios over predicated S/B ratios. In some embodiments, the triple rebaudiosides in the sweetener composition can include DMG, DMO, DMN, and DME at 400 ppm to 600 ppm. In other embodiments, the combination of three rebaudiosides can include DMG, DMO, DMN and DME at 400 ppm and 600 pm. The three rebaudiosides selected from D, M, G, O, N, and E in such combinations range from 5-50 wt %, 10-42 wt %, 30-35 wt % and 20-30 wt % of the sweetener composition. In some embodiments the ratio of the selected three rebaudiosides can be from 1:1:1 to 1:1:2.

Sweetener Compositions with Glycoside Compositions

The disclosed glycoside compositions of rebaudioside D and/or rebaudioside M combined with rebaudioside E, rebaudioside G, rebaudioside N and/or rebaudioside O may be used with a sweetener composition.

The sweetener compositions can include other ingredients in addition to the glycoside composition. In some embodiments, the sweetener composition can include one or more of bulking agents, high-intensity sweeteners, flavorings, antioxidants, caffeine, other nutritive sweeteners, salts, proteins, bitter blockers, or sweetness enhancers.

A bulking agent can include any compositions known in the art used to add bulk to high intensity sweeteners. Bulking agents are often used with high intensity sweeteners, such as the glycoside compositions of this disclosure, to facilitate a direct substitution of sweeteners of this disclosure for other sweeteners, such as sugar, in applications such as baking, cooking, and tabletop uses. A bulking agent may be chosen from a bulk sweetener, a lower glycemic carbohydrate, a fiber, a hydrocolloid, and combinations thereof. A bulk sweetener may be chosen from corn sweeteners, sucrose, dextrose, invert sugar, maltose, dextrin, maltodextrin, fructose, levulose, high fructose corn syrup, corn syrup solids, galactose, trehalose, isomaltulose, fructo-oligosaccharides, and combinations thereof. A lower glycemic carbohydrate may be chosen from fructo-oligosaccharide, galactooligosaccharide, isomaltooligosaccharide, oligodextran, D-tagatose, sorbitol, mannitol, xylitol, lactitol, erythritol, maltitol, other polyols, hydrogenated starch hydrolysates, isomalt, D-psicose, 1,5 anhydro D-fructose, and combinations thereof.

A fiber may be chosen from polydextrose, resistant maltodextrin, resistant starch, inulin, soluble corn fiber, beta-glucan, psyllium, cellulose, hemicellulose, and combinations thereof. A hydrocolloid may be chosen from pectin (e.g., apple, beet, citrus), gum Arabic, guar gum, carboxymethylcellulose, nOSA (n-octenyl succinic anhydride), locust bean gum, cassia gum, xanthan gum, carrageenan, alginate, and combinations thereof.

A high intensity sweetener may be chosen from sucralose, aspartame, saccharin, acesulfame K, alitame, thaumatin, dihydrochalcones, neotame, cyclamates, mogroside, glycyrrhizin, phyllodulcin, monellin, mabinlin, brazzein, circulin, pentadin, monatin, and combinations thereof.

A flavoring may be chosen from a cola flavor, a citrus flavor, a root beer flavor, and combinations thereof. A sweetness enhancer may be chosen from curculin, miraculin, cynarin, chlorogenic acid, caffeic acid, strogins, arabinogalactan, maltol, dihydroxybenzoic acids, and combinations thereof.

Other ingredients such as food starch, flours, protein isolates, protein concentrates, food fats and oils (such as cocoa butter), emulsifiers, food extracts (such as malt extract), and juice concentrates may also be included in sweetener compositions.

In some particular embodiments, the sweetener composition can include a lower glycerine carbohydrate. In certain embodiments, the lower glycernic carbohydrate is erythritol or another polyol. In other embodiments, the disclosed glycosides in a particular sweetener composition can include erythritol as a bulking agent. In other embodiments, the sweetener composition includes inulin.

Food and Beverage Compositions

The glycoside compositions and/or sweetener compositions of the present disclosure can be incorporated into food and beverage compositions. Thus, the present disclosure also contemplates food compositions and beverage compositions that include the glycoside compositions and/or sweetener compositions of the present disclosure.

Examples of food compositions include baked goods, soups, sauces, processed meats, canned fruits, canned vegetables, dairy products, frozen confections, confections, chewing gums, cakes, cookies, bars, and other sweet bakery items, cereals, cereal bars, yogurt, energy bars, granola bars, hard candy, jelly candy, chocolate candy, and other sweetness confections. Examples of beverages include carbonated soft drinks, powdered soft drinks, and ready to drink teas, sports drinks, dairy drinks, yogurt-containing drinks, alcoholic beverages, energy drinks, flavored waters, vitamin drinks, fruit drinks, and fruit juices.

Examples of other compositions or products into which the sweetener compositions of this disclosure can be used include oral care products such as toothpastes, mouthwashes, and oral rinses; pharmaceutical products such as tablets, capsules, lozenges, and suspensions; and nutraceutical products such as supplements, vitamins, probiotics, and prebiotics.

Non-edible products, but those that may be considered as food products, to which the sweetener compositions of this disclosure can be added include tobacco products such as pipe tobacco, snuff, and chewing tobacco.

In some embodiments, a beverage can include at least 300 ppm, 400 ppm, 500 ppm, 600 ppm, 700 ppm, or 800 ppm of the disclosed sweetener composition or glycoside composition.

Methods of Producing Compositions and Sweetener Compositions

The present disclosure also contemplates methods for producing the glycoside compositions and the sweetener compositions. Conventional *stevia*-based sweeteners, for example, include a glycoside composition which consists primarily of rebaudioside A (for example greater than 80% rebaudioside A, greater than 95% rebaudioside A, or greater than 97% rebaudioside A). The present disclosure contemplates adding rebaudioside D and/or rebaudioside M with the other glycosides such as rebaudioside E, rebaudioside G, rebaudioside N and/or rebaudioside O to such conventional sweeteners. In some embodiments, the sweetener composition can include Reb DM and other glycosides such as Reb E, Reb G, Reb O and/or Reb N with Reb A and/or Reb B.

The present disclosure also contemplates controlled conversion between one glycoside and another glycoside to achieve the glycoside compositions of the present disclosure.

A sweetener composition comprising a glycoside composition, wherein the glycoside composition comprises a mixture of rebaudioside D and rebaudioside M, and at least one other glycoside selected from the group consisting of rebaudioside G, rebaudioside O, rebaudioside N, and rebaudioside E.

Some additional non-limiting embodiments are provided below to further exemplify the present disclosure:

1. A sweetener composition comprising a glycoside composition, wherein the glycoside composition comprises a mixture of rebaudioside D and rebaudioside M, and at least one other glycoside selected from the group consisting of rebaudioside G, rebaudioside O, rebaudioside N, and rebaudioside B.
2. The sweetener composition of embodiment 1, wherein the other glycoside is rebaudioside N and rebaudioside O.
3. The sweetener composition of embodiment 1, wherein the other glycoside is rebaudioside N or rebaudioside O.
4. The sweetener composition of any one of embodiments 1-3, wherein the ratio of rebaudioside D to rebaudioside M is in a range of about 1:1 to 1:5, preferably 1:1 to 1:2.
5. The sweetener composition of any one of embodiments 1-3, wherein the ratio of rebaudioside D to rebaudioside M is about 1:1 to 1:3 to about 1:4.
6. The sweetener composition of any one of embodiments 1-3, wherein the ratio of rebaudioside D to rebaudioside M is about 2:3.
7. The sweetener composition of any one of embodiments 1-6, wherein rebaudioside D comprises about 10-45 wt % of the glycoside composition.
8. The sweetener composition of any one of embodiments 1-6, wherein rebaudioside M comprises about 10-45 wt % of the glycoside composition.
9. The sweetener composition of any one of embodiments 1-6, wherein the other glycoside comprises about 15-85 wt % of the glycoside composition.
10. The sweetener composition of any one of embodiments 1-6, wherein the other glycoside comprises about 17-50 wt % of the glycoside composition.
11. The sweetener composition of any one of embodiments 1-6, wherein the other glycoside comprises about 25-34 wt % of the glycoside composition.
12. A sweetener composition comprising a glycoside composition, wherein the glycoside composition comprises rebaudioside D and at least one other glycoside selected from the group consisting of rebaudioside G, rebaudioside O, rebaudioside N, and rebaudioside E.
13. The sweetener composition of embodiment 12, wherein the other glycoside is rebaudioside N and rebaudioside O.
14. The sweetener composition of embodiment 12, wherein the other glycoside is rebaudioside N or rebaudioside O.

15. The sweetener composition of embodiments any one of 12-13, wherein the rebaudioside D is in a range of about 15-75 wt % of the glycoside composition.
16. The sweetener composition of any one of embodiments 12-13, wherein the rebaudioside D is in a range of about 25-50 wt % of the glycoside composition.
17. A sweetener composition comprising a glycoside composition, wherein the glycoside composition comprises a rebaudioside M and at least one other glycoside selected from the group consisting of rebaudioside G, rebaudioside O, rebaudioside N, and rebaudioside E.
18. The sweetener composition of embodiment 17, wherein the other glycoside is rebaudioside N and rebaudioside O.
19. The sweetener composition of embodiment 17, wherein the other glycoside is rebaudioside N or rebaudioside O.
20. The sweetener composition of any one embodiments 17-19, wherein the rebaudioside M is in a range of about 15-75 wt % of the glycoside composition.
21. The sweetener composition of any one of embodiments 17-19, wherein the rebaudioside M is in a range of about 25-50 wt % of the glycoside composition.
22. The sweetener composition of any one of embodiments 1-21 wherein the total amount of glycoside is 200-700 ppm of the sweetener composition.
23. The sweetener composition of any one of embodiments 1-21 wherein the amount of each of rebaudioside D and rebaudioside M is 400-600 ppm of the sweetener composition.
24. The sweetener composition of any of embodiments 1-23, wherein the composition has a sweet value in a range of 6.7 to 8.9 and a bitter value in a range of about 2.5 to 3.5.
25. The sweetener composition of any one of embodiments 1-24 further comprising a bulking agent.
26. The sweetener composition of any one of embodiments 1-25 further comprising erythritol.
27. The sweetener composition of any one of embodiments 1-26 further comprising inulin.
28. A food composition comprising the sweetener composition of any one of embodiments 1-27.
29. A beverage composition comprising the sweetener composition of any one of embodiment 1-28.

EXAMPLES

Example 1

A sensory panel was trained to scale sweetness and bitterness. Reference tasting standards were prepared by dissolving respective standard material (sucrose for sweetness and caffeine for bitterness) into an aqueous citric acid buffer solution at pH 3.1 (distilled water containing 0.1% citric acid and 0.015% sodium citrate) according to the scale values shown in Table 1 below.

TABLE 1

Reference Tasting Standards

| Scale | Concentration (g/kg) | |
|---|---|---|
| | Sucrose (Sweetness) | Caffeine (bitterness) |
| 1 | 10 | 0.107 |
| 2 | 20 | 0.153 |

TABLE 1-continued

Reference Tasting Standards

| Scale | Concentration (g/kg) | |
|---|---|---|
| | Sucrose (Sweetness) | Caffeine (bitterness) |
| 3 | 30 | 0.200 |
| 4 | 40 | 0.246 |
| 5 | 50 | 0.293 |
| 6 | 60 | 0.340 |
| 7 | 70 | 0.386 |
| 8 | 80 | 0.433 |
| 9 | 90 | 0.479 |
| 10 | 100 | 0.526 |
| 11 | 110 | 0.572 |
| 12 | 120 | 0.619 |
| 13 | 130 | 0.666 |
| 14 | 140 | 0.712 |
| 15 | 150 | 0.759 |

Rebaudioside D (purity of 94.4%) was obtained from ChromaDex™ Corp and rebaudioside M (purity 99.3%) was obtained from Cargill, Incorporated.

The trained sensory panel evaluated solutions of each rebaudioside D or rebaudioside M at 400 ppm and 600 ppm shown in Table 2. Solutions were made in the same citric acid buffer as the reference standard solutions. All solutions were heated to 55° C. for 12 minutes to ensure that all the glycoside material was completely dissolved. The solutions were allowed to cool to room temperature before serving to the panelists. Each solution was given a random 3-digit code and was served to the panelists in random order. Panelists dispensed 2 mL of each solution into their mouths from a pipette. The panelists were then asked to rate the "sweetness intensity" and "bitterness intensity" of the solutions and mark their responses on an un-anchored, 15 cm line scale. The length of the line corresponds to the scale values (1-15) on which the participants were trained. The panelists' responses were measured, compiled, and averaged for each sample. Each sample was tested by approximately 17 to 21 trained panelists.

In between testing samples, the panelists cleansed their palates with water and apple slices. The panelists also waited 5 minutes between each sample. Sweetness and bitter values of rebaudioside D (purity of 94.4%) and rebaudioside M (purity of 993%) at varying concentrations were also obtained utilizing a sensory panel in a manner as described above. The sweetness is reported as sweetness and the sweetness is measured as a sucrose equivalent (SEV).

TABLE 2

Mean scores and standard deviation for five replicate tests of Reb D and Reb M at 400 ppm and 600 ppm.

| | Reb M | | Reb D | |
|---|---|---|---|---|
| | 600 ppm | 400 ppm | 600 ppm | 400 ppm |
| Sweetness Avg. | 8.4 | 7.7 | 8.3 | 7.1 |
| Sweetness Std. Dev. | 0.15 | 0.40 | 0.38 | 0.80 |
| Bitter Avg. | 4.2 | 3.8 | 4.2 | 3.6 |
| Bitter Std. Dev. | 0.48 | 0.44 | 0.80 | 0.43 |

The sweetness and bitterness values of sweetener compositions containing Reb D or Reb M with other glycosides are shown in Tables 3-5. As described above, the samples were tasted by the panelist in random order. The tables show the concentration of the composition tested (ppm) as well as the ratio of one glycoside to another in the composition as a weight percentage.

Commercial rebaudioside A (Truvia™ Stevia RA95 95.1% (dry basis) between 200-700 ppm were used throughout the testing to monitor panelist consistency.

Shown below is data for Reb M with other glycosides.

TABLE 3

Compositions that are sweeter or less bitter than 600 ppm Reb M

| Comp to 600 M Total Blend | Blend Percentage (wt %) | | | | | | | Sensory Values | |
|---|---|---|---|---|---|---|---|---|---|
| | | | | | | | | ≥8.3 | <3.7 |
| ppm | A | B | D | M | G | O | N | E | Sweetness (SEV) | Bitter |
| 600 | 0 | 0 | 25 | 0 | 0 | 0 | 75 | 0 | 8.5 | 3.5 |
| 600 | 3 | 1 | 9 | 13 | 0 | 0 | 75 | 0 | 8.5 | 3.6 |
| 600 | 0 | 0 | 0 | 50 | 0 | 0 | 50 | 0 | 8.3 | 3.4 |
| 600 | 5 | 3 | 18 | 25 | 0 | 0 | 50 | 0 | 8.3 | 3.6 |

TABLE 4

Compositions that are sweeter or less bitter than 400 ppm Reb M

| Comp to 400 M Total Blend | Blend Percentage | | | | | | | Sensory Values | |
|---|---|---|---|---|---|---|---|---|---|
| | | | | | | | | ≥7.3 | <3.4 |
| ppm | A | B | D | M | G | O | N | E | Sweetness | Bitter |
| 400 | 0 | 0 | 0 | 0 | 0 | 25 | 75 | 0 | 7.9 | 3.3 |
| 400 | 0 | 0 | 0 | 25 | 0 | 0 | 75 | 0 | 7.8 | 3.3 |
| 400 | 0 | 0 | 10 | 15 | 0 | 0 | 75 | 0 | 7.7 | 3.1 |
| 400 | 0 | 0 | 13 | 38 | 0 | 0 | 50 | 0 | 7.5 | 3.3 |
| 400 | 0 | 0 | 0 | 0 | 0 | 75 | 25 | 0 | 7.5 | 3.1 |
| 400 | 0 | 0 | 0 | 0 | 75 | 0 | 25 | 0 | 7.4 | 3.1 |
| 400 | 8 | 4 | 26 | 38 | 0 | 0 | 25 | 0 | 7.4 | 3.0 |
| 400 | 0 | 0 | 75 | 0 | 0 | 0 | 25 | 0 | 7.4 | 3.1 |
| 400 | 0 | 0 | 0 | 0 | 75 | 0 | 25 | 0 | 7.3 | 3.0 |
| 400 | 0 | 0 | 22 | 66 | 0 | 0 | 13 | 0 | 7.3 | 3.1 |
| 400 | 0 | 0 | 24 | 70 | 0 | 0 | 6 | 0 | 7.3 | 3.0 |

TABLE 5

Compositions that are sweeter or less bitter than 600 ppm Reb D

| Comp to 600 D Total Blend | Blend Percentage | | | | | | | Sensory Values | |
|---|---|---|---|---|---|---|---|---|---|
| | | | | | | | | ≥8.0 | <3.4 |
| ppm | A | B | D | M | G | O | N | E | Sweetness | Bitter |
| 600 | 0 | 0 | 0 | 0 | 0 | 50 | 0 | 50 | 8.0 | 3.1 |
| 600 | 0 | 0 | 19 | 56 | 0 | 0 | 25 | 0 | 8.1 | 3.2 |
| 600 | 0 | 0 | 10 | 15 | 0 | 75 | 0 | 0 | 8.0 | 3.3 |

TABLE 6

Compositions that are sweeter or less bitter than 400 ppm Reb D

| Comp to 400 D Total Blend | Blend Percentage | | | | | | | Sensory Values | |
|---|---|---|---|---|---|---|---|---|---|
| | | | | | | | | ≥6.3 | <3.2 |
| ppm | A | B | D | M | G | O | N | E | Sweetness | Bitter |
| 400 | 0 | 0 | 10 | 15 | 0 | 0 | 75 | 0 | 7.7 | 3.1 |
| 400 | 0 | 0 | 0 | 0 | 0 | 75 | 25 | 0 | 7.5 | 3.1 |
| 400 | 0 | 0 | 25 | 0 | 0 | 0 | 75 | 0 | 7.4 | 3.0 |
| 400 | 8 | 4 | 26 | 38 | 0 | 0 | 25 | 0 | 7.4 | 3.0 |
| 400 | 0 | 0 | 75 | 0 | 0 | 0 | 25 | 0 | 7.4 | 3.1 |
| 400 | 0 | 0 | 0 | 0 | 25 | 0 | 75 | 0 | 7.3 | 3.0 |
| 400 | 0 | 0 | 22 | 66 | 0 | 0 | 13 | 0 | 7.3 | 3.1 |
| 400 | 0 | 0 | 24 | 70 | 0 | 0 | 6 | 0 | 7.3 | 3.0 |
| 400 | 0 | 0 | 0 | 0 | 0 | 100 | 0 | 0 | 7.2 | 3.1 |
| 400 | 0 | 0 | 0 | 0 | 0 | 75 | 0 | 25 | 7.2 | 2.9 |
| 400 | 0 | 0 | 25 | 0 | 0 | 0 | 75 | 0 | 7.1 | 3.0 |
| 400 | 3 | 1 | 9 | 13 | 0 | 75 | 0 | 0 | 7.0 | 2.9 |
| 400 | 0 | 0 | 25 | 25 | 0 | 50 | 0 | 0 | 7.0 | 2.9 |
| 400 | 0 | 0 | 20 | 30 | 0 | 50 | 0 | 0 | 7.0 | 3.0 |
| 400 | 0 | 0 | 33 | 33 | 0 | 34 | 0 | 0 | 6.8 | 3.0 |
| 400 | 0 | 0 | 0 | 0 | 75 | 25 | 0 | 0 | 6.8 | 2.9 |
| 400 | 0 | 0 | 0 | 0 | 0 | 25 | 0 | 75 | 6.8 | 2.9 |
| 400 | 0 | 0 | 75 | 0 | 0 | 25 | 0 | 0 | 6.7 | 2.8 |
| 400 | 0 | 0 | 30 | 45 | 0 | 25 | 0 | 0 | 6.7 | 3.0 |

As seen in Tables 3-6, certain sweetener compositions of Reb DM with other glycosides showed an unexpected higher sweetening ability than rebaudioside D or rebaudioside M alone. Additionally, many of these compositions showed an additional benefit of less bitterness at the same SEV level. Thus, not only did the Reb DM with other combinations of glycosides achieve the same or better SEV level (compared to rebaudioside D or rebaudioside M alone), the Reb DM compositions with other glycosides also showed less bitterness than either rebaudioside D or rebaudioside M alone. This is surprising since rebaudioside D and rebaudioside M are considered to be sweeter and less bitter than many other glycosides, including rebaudioside A and rebaudioside B.

Example 2

Combinations of various rebaudiosides were evaluated for better than predicted sweetness/bitterness ratios (S/B).

A trained sensory panel evaluated solutions of each rebaudioside D, rebaudioside M, rebaudioside G, rebaudioside O, rebaudioside N and rebaudioside E at 400 ppm and 600 ppm. Solutions were made in a citric acid buffer as the reference standard solutions described in Example 1. All solutions were heated to 55° C. for 12 minutes to ensure that all the glycoside material was completely dissolved. The solutions were allowed to cool to room temperature before serving to the panelists. Each solution was given a random 3-digit code and was served to the panelists in random order. Panelists dispensed 2 mL of each solution into their mouths from a pipette. The panelists were then asked to rate the "sweetness intensity" and "bitterness intensity" of the solutions and mark their responses on an un-anchored, 15 cm line scale. The length of the line corresponds to the scale values (1-15) on which the participants were trained. The panelists' responses were measured, compiled, and averaged for each sample (measured sweetness values and bitterness values).

In between testing samples, the panelists cleansed their palates with water and apple slices. The panelists also waited 5 minutes between each sample. Rebaudioside D (purity of 94.4%) was obtained from ChromaDex™ Corp and rebaudioside M (purity 99.3%) was obtained from Cargill, Incorporated. Rebaudioside G (purity of 96.0%), Rebaudioside O (purity of 97.9%), Rebaudioside N (purity of 93.5%), Rebaudioside E (purity of 97.2%) were each obtained from ChromaaDex™ Corp.

Table 7 shows the sweetness and bitterness values of each rebaudioside D, rebaudioside M, rebaudioside G, rebaudioside O, rebaudioside N and rebaudioside E at 400 ppm and 600 pm each. Also shown in Table 7 is the sweetness/bitterness ratios (S/B).

TABLE 7

|  | Sweetness | Bitterness | S/B |
|---|---|---|---|
| Glycoside at 400 ppm |  |  |  |
| Reb G | 2.17 | 2.53 | 0.86 |
| Reb E | 4.53 | 2.93 | 1.55 |
| Reb N | 7.44 | 3.03 | 2.45 |
| Reb O | 7.47 | 2.98 | 2.51 |
| Reb D | 7.08 | 3.51 | 2.05 |
| Reb M | 7.76 | 3.65 | 2.14 |
| Glycoside at 600 ppm |  |  |  |
| Reb D | 8.31 | 3.80 | 2.23 |
| Reb M | 8.38 | 3.76 | 2.26 |
| Reb G | 1.98 | 2.30 | 0.84 |
| Reb E | 6.29 | 2.98 | 2.11 |
| Reb N | 7.709 | 3.25 | 2.37 |
| Reb O | 7.669 | 3.23 | 2.37 |

The sweetness and bitterness values of various rebaudioside combinations selected from D, M, G, O, N and E were tested and compared to predicted results. The results were predicted based on weight percentage of the individual rebaudioside used in the total sweetener combination and at a given sweetness or bitterness ratio of the individual rebaudioside at a particular concentration (ppm). For example, shown in Table 8 is the predicted and measured data for the glycoside combination DMN:

TABLE 8

| 400 ppm Glycosides | D | M | N | Sweetness | Bitterness | S/B |
|---|---|---|---|---|---|---|
| Predicted | 41.60 | 41.60 | 16.79 | 7.42 | 3.49 | 2.13 |
| Measured | 41.60 | 41.60 | 16.79 | 7.55 | 2.52 | 3.00 |

To compute the predicted glycoside composition containing DMN, one can use the below Formula 1:

((wt % of D in the total sweetener composition×D's sweetness value from Table 7)+(wt % of M in the total sweetener composition×M's sweetness value from Table 7)+(wt % of N in the total sweetener composition×N's sweetness value from Table 7))/100

Using Formula 1 and Table 7, the predicted sweetness values for DMN=7.42

((41.6×7.08)+(41.6×7.76)+(16.79×7.44))/100

(294.5+322.8+124.9)/100=742.2/100=7.42

Likewise, using Formula 1 and Table 7, the predicted bitterness values for DMN can be computed. Using Formula 1 and Table 7, the predicted sweetness and bitterness values may also be computed for any sweetener combination selected from rebaudioside D, rebaudioside M, rebaudioside G, rebaudioside O, rebaudioside N and rebaudioside E.

It was found that by comparing predicted S/B ratios with actual or measured S/B ratios that certain glycoside combinations at particular weight percentages provided sweetness/bitterness ratios better than predicted sweetness/bitterness ratios.

The unexpected results are shown below in Tables 9-17 for sweetener compositions at 400 ppm concentration and the weight percentage of the particular rebaudioside in the total sweetener composition that showed sweetness/bitterness ratios better than predicted sweetness/bitterness ratios.

TABLE 9

| DO | | | | | | | |
|---|---|---|---|---|---|---|---|
| D | O | Measured Sweetness | Measured Bitterness | Measured S/B | Predicted Sweetness | Predicted Bitterness | Predicted S/B |
| 75.00 | 25.00 | 7.07 | 2.92 | 2.42 | 7.18 | 3.38 | 2.12 |
| 50.00 | 50.00 | 6.95 | 3.18 | 2.18 | 7.28 | 3.25 | 2.24 |
| 25.00 | 75.00 | 6.80 | 3.10 | 2.19 | 7.38 | 3.11 | 2.37 |

TABLE 10

| DN | | | | | | | |
|---|---|---|---|---|---|---|---|
| D | N | Measured Sweetness | Measured Bitterness | Measured S/B | Predicted Sweetness | Predicted Bitterness | Predicted S/B |
| 75.00 | 25.00 | 7.19 | 3.24 | 2.22 | 7.17 | 3.39 | 2.11 |
| 50.00 | 50.00 | 7.53 | 3.06 | 2.46 | 7.26 | 3.27 | 2.22 |
| 25.00 | 75.00 | 7.39 | 2.98 | 2.48 | 7.35 | 3.15 | 2.33 |

TABLE 11

| | | | | MO | | | |
|---|---|---|---|---|---|---|---|
| M | O | Measured Sweetness | Measured Bitterness | Measured S/B | Predicted Sweetness | Predicted Bitterness | Predicted S/B |
| 75.00 | 25.00 | 7.42 | 2.93 | 2.54 | 7.68 | 3.48 | 2.21 |
| 50.00 | 50.00 | 7.07 | 3.17 | 2.23 | 7.61 | 3.31 | 2.30 |
| 25.00 | 75.00 | 6.69 | 2.75 | 2.44 | 7.54 | 3.15 | 2.40 |

TABLE 12

| | | | | MN | | | |
|---|---|---|---|---|---|---|---|
| M | N | Measured Sweetness | Measured Bitterness | Measured S/B | Predicted Sweetness | Predicted Bitterness | Predicted S/B |
| 75.00 | 25.00 | 7.88 | 3.18 | 2.48 | 7.68 | 3.49 | 2.20 |
| 50.00 | 50.00 | 7.37 | 3.03 | 2.43 | 7.60 | 3.34 | 2.27 |
| 25.00 | 75.00 | 7.04 | 2.98 | 2.36 | 7.52 | 3.19 | 2.36 |

TABLE 13

| | | | | | DMG | | | |
|---|---|---|---|---|---|---|---|---|
| D | M | G | Measured Sweetness | Measured Bitterness | Measured S/B | Predicted Sweetness | Predicted Bitterness | Predicted S/B |
| 41.60 | 41.60 | 16.79 | 8.04 | 3.31 | 2.43 | 6.54 | 3.40 | 1.92 |
| 33.25 | 33.25 | 33.50 | 5.21 | 3.00 | 1.74 | 5.66 | 3.23 | 1.75 |
| 25.00 | 25.00 | 50.00 | 5.32 | 3.20 | 1.66 | 4.79 | 3.05 | 1.57 |

TABLE 14

| | | | | | DMO | | | |
|---|---|---|---|---|---|---|---|---|
| D | M | O | Measured Sweetness | Measured Bitterness | Measured S/B | Predicted Sweetness | Predicted Bitterness | Predicted S/B |
| 41.60 | 41.60 | 16.79 | 7.65 | 3.06 | 2.50 | 7.43 | 3.48 | 2.13 |
| 33.25 | 33.25 | 33.50 | 8.10 | 3.30 | 2.45 | 7.44 | 3.38 | 2.20 |
| 33.00 | 33.00 | 34.00 | 7.32 | 2.41 | 3.04 | 7.44 | 3.38 | 2.20 |
| 33.00 | 33.00 | 34.00 | 7.25 | 2.39 | 3.03 | 7.44 | 3.38 | 2.20 |
| 30.00 | 45.00 | 25.00 | 7.82 | 2.96 | 2.64 | 7.48 | 3.44 | 2.18 |
| 20.00 | 30.00 | 50.00 | 7.01 | 2.98 | 2.35 | 7.48 | 3.29 | 2.28 |
| 10.00 | 15.00 | 75.00 | 7.19 | 2.91 | 2.47 | 7.48 | 3.13 | 2.39 |

TABLE 15

| | | | | | DMN | | | |
|---|---|---|---|---|---|---|---|---|
| D | M | N | Measured Sweetness | Measured Bitterness | Measured S/B | Predicted Sweetness | Predicted Bitterness | Predicted S/B |
| 41.60 | 41.60 | 16.79 | 7.86 | 2.54 | 3.09 | 7.42 | 3.49 | 2.13 |
| 41.60 | 41.60 | 16.79 | 7.55 | 2.52 | 3.00 | 7.42 | 3.49 | 2.13 |
| 41.60 | 41.60 | 16.79 | 8.11 | 3.16 | 2.57 | 7.42 | 3.49 | 2.13 |
| 33.25 | 33.25 | 33.50 | 7.74 | 3.25 | 2.38 | 7.42 | 3.40 | 2.19 |
| 30.00 | 45.00 | 25.00 | 7.79 | 3.33 | 2.34 | 7.47 | 3.45 | 2.16 |
| 25.00 | 25.00 | 50.00 | 7.84 | 3.18 | 2.47 | 7.43 | 3.31 | 2.25 |
| 20.00 | 30.00 | 50.00 | 7.33 | 2.87 | 2.55 | 7.46 | 3.31 | 2.25 |
| 10.00 | 15.00 | 75.00 | 7.49 | 3.28 | 2.28 | 7.45 | 3.17 | 2.35 |

TABLE 16

| | | | | | DME | | | |
|---|---|---|---|---|---|---|---|---|
| D | M | E | Measured Sweetness | Measured Bitterness | Measured S/B | Predicted Sweetness | Predicted Bitterness | Predicted S/B |
| 41.60 | 41.60 | 16.79 | 6.94 | 3.10 | 2.24 | 6.93 | 3.47 | 2.00 |
| 33.25 | 33.25 | 33.50 | 7.63 | 3.23 | 2.36 | 6.45 | 3.36 | 1.92 |
| 25.00 | 25.00 | 50.00 | 6.94 | 3.02 | 2.30 | 5.98 | 3.25 | 1.84 |

TABLE 17

| | | | | GE | | | |
|---|---|---|---|---|---|---|---|
| G | E | Measured Sweetness | Measured Bitterness | Measured S/B | Predicted Sweetness | Predicted Bitterness | Predicted S/B |
| 75.00 | 25.00 | 2.03 | 2.49 | 0.81 | 2.76 | 2.63 | 1.05 |
| 50.00 | 50.00 | 2.89 | 2.75 | 1.05 | 3.35 | 2.73 | 1.23 |
| 25.00 | 75.00 | 3.76 | 2.85 | 1.32 | 3.94 | 2.83 | 1.39 |

Shown below in Tables 18-26 are the sweetener compositions at 600 ppm concentration and the weight percentage of the particular rebaudioside in the total sweetener composition that showed sweetness over bitterness values better than predicted sweetness over bitterness values.

TABLE 18

| | | | | DM | | | |
|---|---|---|---|---|---|---|---|
| D | O | Measured Sweetness | Measured Bitterness | Measured S/B | Predicted Sweetness | Predicted Bitterness | Predicted S/B |
| 75.00 | 25.00 | 7.67 | 3.18 | 2.41 | 8.14 | 3.66 | 2.23 |
| 50.00 | 50.00 | 7.50 | 3.04 | 2.47 | 7.98 | 3.51 | 2.27 |
| 25.00 | 75.00 | 7.66 | 3.23 | 2.37 | 7.82 | 3.37 | 2.32 |

TABLE 19

| | | | | DN | | | |
|---|---|---|---|---|---|---|---|
| D | N | Measured Sweetness | Measured Bitterness | Measured S/B | Predicted Sweetness | Predicted Bitterness | Predicted S/B |
| 75.00 | 25.00 | 8.22 | 3.22 | 2.56 | 8.15 | 3.66 | 2.23 |
| 50.00 | 50.00 | 8.31 | 3.33 | 2.49 | 8.00 | 3.52 | 2.27 |
| 25.00 | 75.00 | 7.74 | 3.21 | 2.41 | 7.85 | 3.39 | 2.32 |

TABLE 20

| | | | | MO | | | |
|---|---|---|---|---|---|---|---|
| M | O | Measured Sweetness | Measured Bitterness | Measured S/B | Predicted Sweetness | Predicted Bitterness | Predicted S/B |
| 75.00 | 25.00 | 8.10 | 3.22 | 2.52 | 8.20 | 3.63 | 2.26 |
| 50.00 | 50.00 | 7.82 | 2.88 | 2.72 | 8.02 | 3.50 | 2.29 |
| 25.00 | 75.00 | 7.99 | 3.19 | 2.50 | 7.84 | 3.36 | 2.33 |

TABLE 21

| | | | MN | | | | |
|---|---|---|---|---|---|---|---|
| M | N | Measured Sweetness | Measured Bitterness | Measured S/B | Predicted Sweetness | Predicted Bitterness | Predicted S/B |
| 75.00 | 25.00 | 8.41 | 3.41 | 2.47 | 8.21 | 3.63 | 2.26 |
| 50.00 | 50.00 | 8.06 | 2.96 | 2.72 | 8.04 | 3.51 | 2.29 |
| 25.00 | 75.00 | 7.99 | 3.19 | 2.50 | 7.87 | 3.38 | 2.33 |

TABLE 22

| | | | DMG | | | | |
|---|---|---|---|---|---|---|---|
| D | M | G | Measured Sweetness | Measured Bitterness | Measured S/B | Predicted Sweetness | Predicted Bitterness | Predicted S/B |
| 41.67 | 41.67 | 16.67 | 8.20 | 3.17 | 2.59 | 7.27 | 3.53 | 2.06 |
| 33.33 | 33.33 | 33.33 | 7.39 | 3.25 | 2.28 | 6.21 | 3.29 | 1.89 |
| 25.00 | 25.00 | 50.00 | 6.46 | 3.03 | 2.13 | 5.14 | 3.04 | 1.69 |

TABLE 23

| | | | DMO | | | | |
|---|---|---|---|---|---|---|---|
| D | M | O | Measured Sweetness | Measured Bitterness | Measured S/B | Predicted Sweetness | Predicted Bitterness | Predicted S/B |
| 41.67 | 41.67 | 16.67 | 8.40 | 3.27 | 2.57 | 8.23 | 3.69 | 2.23 |
| 33.33 | 33.33 | 33.33 | 8.87 | 3.28 | 2.71 | 8.12 | 3.60 | 2.26 |
| 33.00 | 33.00 | 34.00 | 8.19 | 2.55 | 3.21 | 8.11 | 3.59 | 2.26 |
| 33.00 | 33.00 | 34.00 | 7.87 | 2.51 | 3.13 | 8.11 | 3.59 | 2.26 |
| 30.00 | 45.00 | 25.00 | 8.26 | 3.51 | 2.35 | 8.18 | 3.64 | 2.25 |
| 25.00 | 25.00 | 50.00 | 8.24 | 3.39 | 2.43 | 8.00 | 3.51 | 2.28 |
| 20.00 | 30.00 | 50.00 | 7.87 | 3.04 | 2.59 | 8.01 | 3.50 | 2.28 |
| 10.00 | 15.00 | 75.00 | 7.80 | 3.01 | 2.60 | 7.83 | 3.37 | 2.33 |

TABLE 24

| | | | DMN | | | | |
|---|---|---|---|---|---|---|---|
| D | M | N | Measured Sweetness | Measured Bitterness | Measured S/B | Predicted Sweetness | Predicted Bitterness | Predicted S/B |
| 41.67 | 41.67 | 16.67 | 8.89 | 3.20 | 2.77 | 8.24 | 3.69 | 2.23 |
| 41.60 | 41.60 | 16.81 | 7.96 | 2.46 | 3.24 | 8.23 | 3.69 | 2.23 |
| 41.60 | 41.60 | 16.81 | 8.26 | 2.56 | 3.23 | 8.23 | 3.69 | 2.23 |
| 33.33 | 33.33 | 33.33 | 8.68 | 3.47 | 2.50 | 8.13 | 3.60 | 2.26 |
| 30.00 | 45.00 | 25.00 | 8.21 | 3.09 | 2.66 | 8.19 | 3.65 | 2.25 |
| 25.00 | 25.00 | 50.00 | 8.23 | 3.26 | 2.53 | 8.02 | 3.51 | 2.28 |
| 20.00 | 30.00 | 50.00 | 8.52 | 3.19 | 2.67 | 8.03 | 3.51 | 2.28 |
| 10.00 | 15.00 | 75.00 | 8.02 | 3.37 | 2.38 | 7.86 | 3.38 | 2.33 |

TABLE 25

| | | | DME | | | | |
|---|---|---|---|---|---|---|---|
| D | M | E | Measured Sweetness | Measured Bitterness | Measured S/B | Predicted Sweetness | Predicted Bitterness | Predicted S/B |
| 41.67 | 41.67 | 16.67 | 8.44 | 3.24 | 2.61 | 8.00 | 3.65 | 2.19 |
| 33.33 | 33.33 | 33.33 | 8.71 | 3.33 | 2.61 | 7.66 | 3.51 | 2.18 |
| 25.00 | 25.00 | 50.00 | 7.88 | 3.35 | 2.36 | 7.31 | 3.38 | 2.16 |

TABLE 26

| | | GE | | | | | |
|---|---|---|---|---|---|---|---|
| G | E | Measured Sweetness | Measured Bitterness | Measured S/B | Predicted Sweetness | Predicted Bitterness | Predicted S/B |
| 75.00 | 25.00 | 1.93 | 2.30 | 0.84 | 3.02 | 2.47 | 1.22 |
| 50.00 | 50.00 | 2.75 | 2.58 | 1.07 | 4.11 | 2.64 | 1.56 |
| 25.00 | 75.00 | 3.65 | 2.78 | 1.31 | 5.20 | 2.81 | 1.85 |

The invention claimed is:

1. A sweetener composition comprising rebaudioside O, rebaudioside D, and rebaudioside M, wherein rebaudioside O is 20-80 wt %, rebaudioside D is 10-50 wt %, and rebaudioside M is 15-50 wt % of total glycosides in the sweetener composition and a weight ratio of the total of rebaudioside O to the total of rebaudioside D and rebaudioside M is greater than 0.1.

2. The composition of claim 1, wherein the sweetener composition additionally comprises at least one other ingredients, and
wherein the total of rebaudiosides D, M, and O is at least 40 wt % of the sweetener composition.

3. The composition of claim 1, further comprising at least one of rebaudioside E and rebaudioside G.

4. The composition of claim 1, further comprising rebaudioside E, wherein rebaudioside E is 30-60 wt % of the total sweetener composition.

5. The composition of claim 1, further comprising rebaudioside G, wherein rebaudioside G is 30-60 wt % of the total sweetener composition.

6. The composition of claim 1, wherein the ratio of rebaudioside O to the total of rebaudioside D and rebaudioside M (% rebaudioside O/(% rebaudioside D+% rebaudioside M)) is in the range of about 0.2 to 3.

7. A beverage, a citric acid buffer at pH 3.1, or an aqueous solution has a sucrose equivalent (SEV) of at least 7.3 wherein the beverage, the citric acid buffer at pH 3.1, or the aqueous solution comprises the composition of claim 1 at a concentration of 400 ppm.

8. A beverage, a citric acid buffer at pH 3.1, or an aqueous solution has a sucrose equivalent (SEV) of at least 8.3 wherein the beverage, the citric acid buffer at pH 3.1, or the aqueous solution comprises the composition of claim 1 at a concentration of 600 ppm.

9. The composition of claim 1, wherein a citric acid buffer at pH 3.1 containing the composition at a concentration of 400 ppm has a bitterness value of 3.4 or less.

10. The composition of claim 1, wherein a citric acid buffer at pH 3.1 containing the composition at a concentration of 600 ppm has a bitterness value of 3.7 or less.

11. The composition of claim 1, wherein a citric acid buffer at pH 3.1 containing the composition at a concentration of 400 ppm has a sweetness/bitterness ratio (SB) from about 1.1 to about 3.2.

12. The composition of claim 1, wherein a citric acid buffer at pH 3.1 containing the composition at a concentration of 600 ppm has a sweetness/bitterness ratio (SB) from about 1.1 to about 3.2.

13. The composition of claim 1, further comprising a bulking agent.

14. The composition of claim 1, further comprising erythritol.

15. The composition of claim 1, further comprising inulin.

16. A beverage comprising the sweetener composition of claim 1.

17. A beverage comprising at least 300 ppm of the sweetener composition of claim 1.

18. A sweetener composition comprising rebaudioside O, rebaudioside D, and rebaudioside M, wherein rebaudioside O is 20-80 wt %, rebaudioside D is 10-50 wt %, and rebaudioside M is 15-50 wt % of total glycosides in the sweetener composition,
wherein a weight ratio of the total of rebaudioside O to the total of rebaudioside D and rebaudioside M is between 0.3 and 3.5.

19. The composition of claim 18, wherein the sweetener composition additionally comprises at least one other ingredients, and
wherein the total of rebaudiosides D, M, and O is at least 40 wt % of the sweetener composition.

* * * * *